M. JACKSON.
Adjustable Journals.
No. 135,477. Patented Feb. 4, 1873.
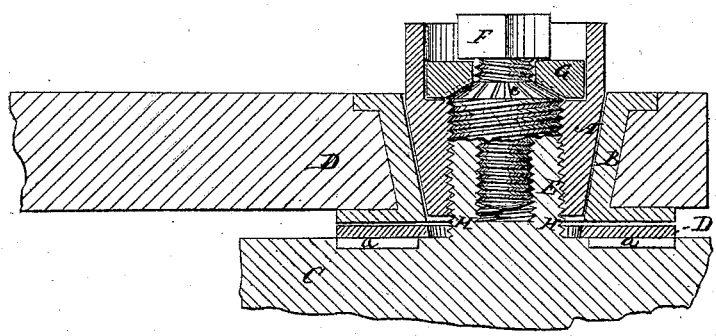
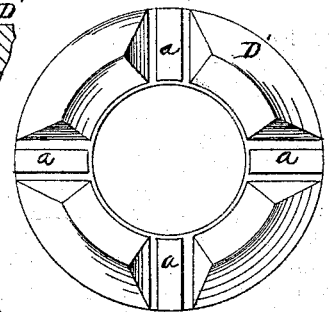
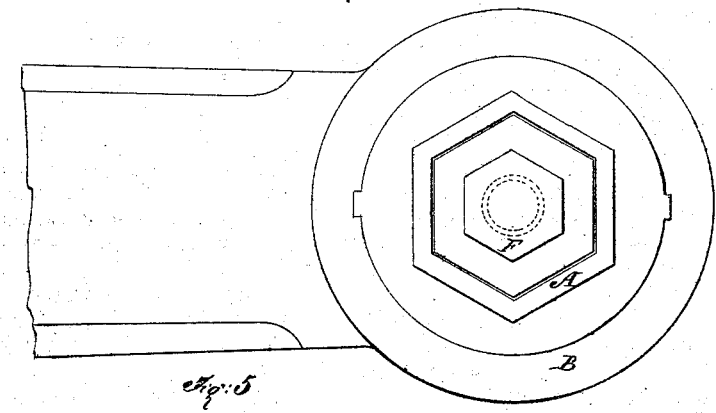
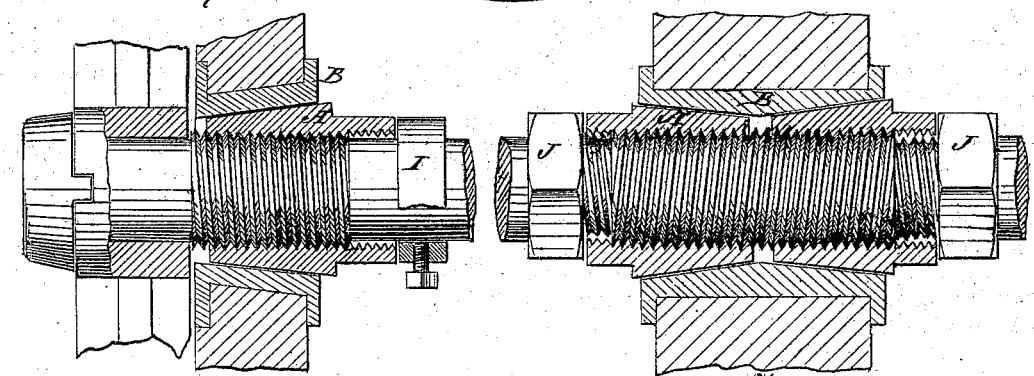
Witnesses: Chas. Nida, C. Sedgwick
Inventor: M. Jackson
per Munn & Co.
Attorneys.

UNITED STATES PATENT OFFICE.

MOSES JACKSON, OF BAVINGTON, PENNSYLVANIA.

IMPROVEMENT IN ADJUSTABLE JOURNALS.

Specification forming part of Letters Patent No. 135,477, dated February 4, 1873.

*To all whom it may concern:*

Be it known that I, MOSES JACKSON, of Bavington, in the county of Washington and State of Pennsylvania, have invented a new and useful Improvement in Adjustable Journal, of which the following is a specification:

This invention relates to shaft and wrist journal-bearings; and consists in a mode of compensating for the wear by means of a right-and-left hand screw and tapering journal, the construction and application being hereinafter more fully shown in the drawing, and described in the specification.

Figure 1 is a longitudinal section. Fig. 2 is a top view. Fig. 3 is a view of the reverse side of bearing-washer. Fig. 4 is a view of the screw-nut washer. Figs. 5 and 6 represent the device as applied to the end and middle bearing of a shaft.

Similar letters of reference indicate corresponding parts.

A is a conical sleeve screwing on the stem E and fitting in a flanged box, B. C may be regarded as a fast pulley, and D as a loose pulley; or C may be a pitman-rod, and D the arm of a crank-shaft, the means of connection being in either case the same; C and E are shown formed in one piece, but with part of the latter cut away to show the screw F screwed into the same. The rounded or beveled end of the stem E fits in a concavity of the washer G, and both are radially grooved to prevent them from slipping on each other. The washer G fits in the concavity of the sleeve, and is interposed between the head of the bolt F and the head of the stem E. A bearing-washer, D', is applied to the part C, and its ribs or flanges *a* set into corresponding depressions and prevent it from turning. It will be seen that the stem E has exteriorly a right-hand screw-thread, while interiorly it has a left-handed screw-thread.

The parts above-named being arranged in the position shown in Fig. 1 they will operate as follows: The part B will always turn freely on the wrist-pin formed by the sleeve A and stem E, but as wear will occur it is necessary to occasionally tighten the connection, which is done by turning the screw F. The parts cannot become disengaged or even loose otherwise than by wear, owing to the reverse threads on the screw F and stem E.

This device is applicable in principle to shaft-journals, as represented in Figs. 5 and 6, where an adjustable collar, I, or jam-nuts J may be used.

The box B is formed of Babbitt metal, and cast on the part on which it is to be used.

Having thus described my invention, I claim as new, and desire to secure by Letters Patent—

The combination, with the parts C D, of the tubular stem E and bolt F having reverse screw-threads, the conical chambered sleeve A, and washer G, as shown and described.

MOSES JACKSON.

Witnesses:
JOSEPH M. JACKSON,
JOSEPH SPENCER.